May 30, 1967 R. M. MORRIS 3,322,920
THERMOSTATIC CONTROL HAVING MAGNIFIED MOVEMENT OF SNAP MEMBER
Filed Sept. 9, 1963
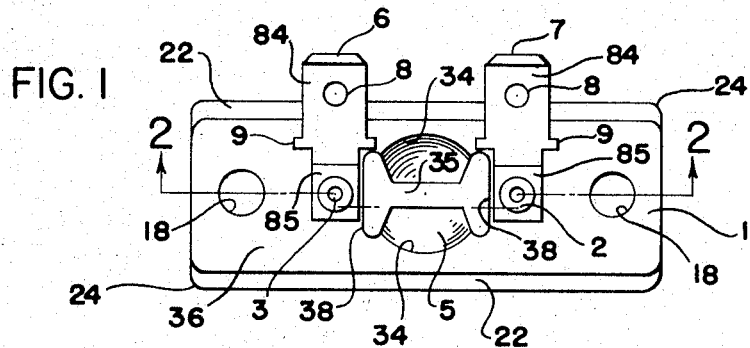
FIG. 1
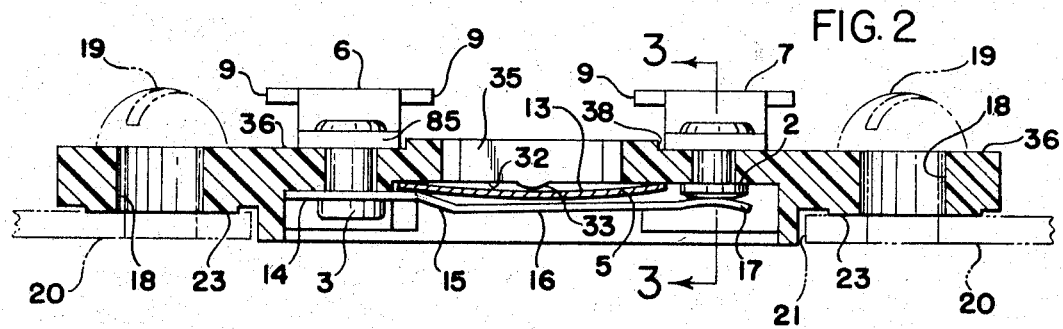
FIG. 2
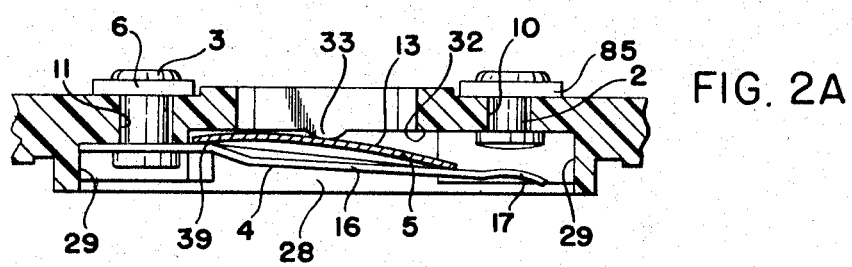
FIG. 2A
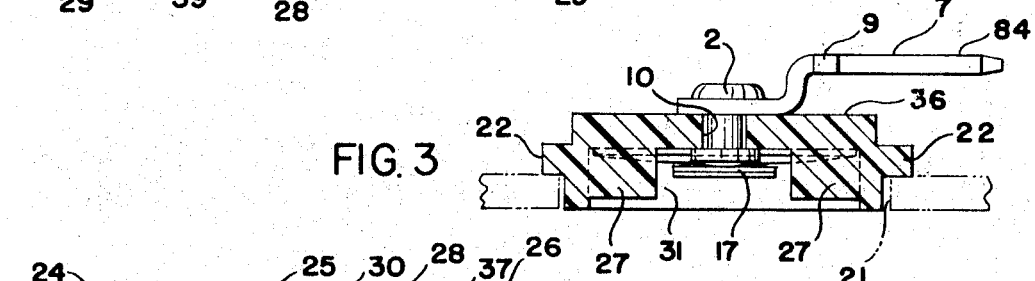
FIG. 3
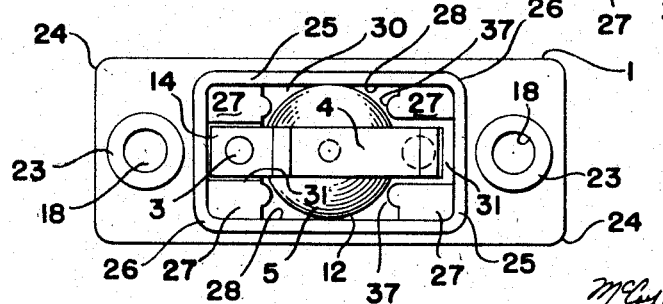
FIG. 4
INVENTOR.
REXFORD M. MORRIS
BY
ATTORNEYS United States Patent Office 3,322,920
Patented May 30, 1967

3,322,920
THERMOSTATIC CONTROL HAVING MAGNIFIED
MOVEMENT OF SNAP MEMBER
Rexford M. Morris, Mansfield, Ohio, assignor to Therm-
O-Disc, Incorporated, Mansfield, Ohio, a corporation
of Ohio
Filed Sept. 9, 1963, Ser. No. 307,719
4 Claims. (Cl. 200—138)

The present invention relates to a simple, inexpensive, thermostatic control device and more particularly to a control having a bimetallic, thermostatic disc maintained in operative position on a plastic base by a movable, electrically conductive, contact arm extending between terminals on said base at diametrically opposed points with respect to the disc.

For many years attempts have been made to reduce the cost and improve the operation of thermostatic controls. The present invention provides an extremely simple thermostatic control which can be manufactured at relatively low cost but yet functions efficiently. The cost of assembly is minimized in that only two rivets are required to maintain all of the parts of the device in assembled relation. One of the rivets provides a stationary contact element at one electrical terminal and the other rivet secures the other electrical terminal and also a cantilever-mounted spring arm which supports a movable contact element at its free end for engaging the said stationary contact element. A snap-acting bimetallic thermostatic disc is mounted between the spring arm and a flat surface of a recess formed in the plastic base member and is engageable with a projection formed on said surface of the recess, whereby the movement of the central portion of the disc, as the disc snaps between positions of opposite concavity, causes the edge of the disc adjacent the free end of the spring arm to move a distance greater than the confined edge portion of the disc and sufficient to break the electrical connection between the stationary contact and the movable contact carried on the spring arm. The unusual arrangement of the parts provides a thermostatic control capable of efficient effective operation and which can be produced at relatively low cost.

It is among the objects of the present invention to provide a thermostatic control which is reliable in operation but which may be produced at an extremely low cost.

A further object of the invention is to provide a thermostatic control which occupies small space on the appliance to which it may be readily and easily applied.

Another object of the invention is to provide a thermostatic control having a minimum number of parts which can be assembled at minimum cost.

These and other objects, uses and advantages of the invention will become apparent to those skilled in the art from the following detailed description taken in conjunction with the accompanying drawings, in which like reference characters denote corresponding parts throughout the several views and in which:

FIGURE 1 is a top plan view on an enlarged scale showing the thermostatic control of this invention;

FIGURE 2 is a longitudinal, vertical, sectional view taken on the line 2—2 of FIGURE 1 and on a larger scale, the mounting plate and mounting screws being shown in dot-dash lines;

FIGURE 2A is a fragmentary, longitudinal, vertical, sectional view similar to FIGURE 2 and on the same scale but showing the position of the parts when the switch elements are open;

FIGURE 3 is a transverse, vertical, sectional view taken on the line 3—3 of FIGURE 2 and on the same scale, the mounting plate being shown in dot-dash lines; and FIGURE 4 is a plan view of the bottom of the thermostatic control on the same scale as FIGURE 1.

Referring more particularly to the drawings, which are drawn substantially to scale, the thermostatic control device of this invention comprises essentially seven parts. These include a substantially rectangular plastic base 1, a stationary contact 2 in the form of a headed tubular metal rivet, a headed tubular metal rivet 3, a movable contact arm 4 in the form of a cantilever-mounted spring, a bimetallic thermostatic disc 5, and two offset blade terminals 6 and 7 formed from flat strips of brass or other suitable metal. Each of the terminals 6 and 7 has a circular hole 8 and two laterally projecting portions 9 in the flat outer portion 84 of the terminal which overhangs the side of the base 1. The rectangular base portions 85 of the terminals 6 and 7 are rigidly held against the flat upper surface 36 of the plastic base by the rivets 2 and 3 which are made of brass, silver, or other suitable electrically conductive material, the rivets extending through the cylindrical holes 10 and 11 of the base and having enlarged heads with a diameter greater than that of said holes. The end of each tubular rivet extends through the circular hole at the center of the flat portion 85 and is peened or offset against the terminal in the conventional manner to form a rigid connection.

The enlarged head of the stationary contact 2 engages the flat bottom surface of the recess 30 formed in the plastic base and provides a stationary electrical contact for engaging the free end 17 of the cantilever arm 4, the stationary contact 2 and the movable contact mounted on the arm 4 providing a normally-closed electric switch for controlling the flow of current between the terminals 6 and 7. The enlarged head of the rivet 3 engages the flat attaching portion 14 of the cantilever-mounted arm and rigidly connects the arm to the base 1 while at the same time providing an electrical connection between the electrically conductive arm 4 and the terminal 6.

The arm 4, which is made of an electrically conductive material, such as an alloy of silver, magnesium and nickel or other suitable metal alloy, is preferably bent between the attaching portion 14 and the main straight portion 16 to provide an inclined bent portion 15. The contact portion 17 of the arm, which engages the stationary contact 2 may be curved as shown herein. However, a separate contact element may be secured to the end of the arm for engagement with the fixed contact element 2. The arm is shaped so that it normally holds the contact portion 17 against the fixed contact 2 as shown in FIGURE 2 of the drawings. The spring arm 4 has sufficient strength to support the weight of the disc 5 and to hold the disc in the recess 30 while at the same time holding the switch elements 2 and 17 closed. However, the arm will yield and permit opening of the switch as shown in FIGURE 2A when the disc is heated sufficiently to cause it to snap to a position of opposite concavity as shown in that figure.

The disc 5 has a circular peripheral edge 12 and a curved upper surface 13 which is adapted to engage the central projection 33 of the plastic base. When the disc snaps from the position shown in FIGURE 2 to the position of opposite concavity shown in FIGURE 2A, the surface 13 engages the projection 33 and the peripheral edge 12 engages the arm 4 to move the portion 17 a substantial distance away from the stationary contact 2, said distance being sufficient to break the electrical connection and to interrupt the flow of current through the wires (not shown) which are connected to the terminals 6 and 7. The operation of the disc will be described in more detail hereinafter.

The bimetallic disc 5 is of conventional construction and has two stable positions of equilibrium as shown in FIGURES 2 and 2A. When the temperature of the disc is below a predetermined range, the disc snaps to the concave position of FIGURE 2, and when the disc is heated to a temperature beyond said range, it snaps to the position of opposite concavity shown in FIGURE 2A.

The base 1 may be made of any suitable dielectric material so as to prevent flow of electrical current between the terminals 6 and 7 when the switch is open. The base is preferably formed from a conventional synthetic resin by a conventional molding process. The base is molded to provide two circular attaching holes 18 which are adapted to receive conventional screws 19. As shown in FIGURES 2 and 3, the base may readily be rigidly connected to a mounting plate 20 by means of the screws 19, the plastic base 1 fitting in the rectangular opening 21 of said mounting plate with its side flanges 22 resting on the margin of said opening as shown in FIGURE 3. It will be noted that the base 1 is generally flat; the side flanges 22, the mounting surfaces 23, and the bottom surface 32 being parallel to the flat upper surface 36. The periphery of the base is rectangular except for the rounded corners 24.

As herein shown, the base 1 has a wall 25 of uniform height and generally rectangular shape which projects away from the surface 36, the corners 26 of the wall being rounded like the corners 24. A post 27 is provided at each corner of the rectangular wall 25 to locate the arm 4 and the disc 5 in the recess 30 formed between the inner side surfaces 28 and the inner end surfaces 29 of the wall 25. The two posts 27 at each end of the recess 30 define a channel or groove 31 having a width slightly greater than that of the flat strip forming the arm 4, the posts projecting below the surface 32 a substantial distance so as to extend below portions of the arm when the arm is in its lowermost position as shown in FIGURE 2A. Thus, the posts 27 at the fixed end of the arm 4 prevent turning of the arm about the rivet 3 at all times.

Each of the posts 27 has a projecting semi-cylindrical surface 37 which extends the full height of the post and which is located adjacent the peripheral edge 12 of the disc to center the disc in the recess 30. Since the surfaces 37 extend below the disc 5 when the arm 4 is in its lowermost position as shown in FIGURE 2A, the disc cannot fall out of the recess 30 when the switch is open. The posts 27, therefore, provide guide means for locating the disc 5 and the arm 4 in the recess 30 without interfering with movement thereof normal to the surface 36. Since the posts 27 and the wall 25 extend well below the parts 3, 4 and 5, such parts are well protected even in the absence of a cover.

It is necessary to permit heat to freely contact the thermostatic disc 5 in order to effect operation of the control, and accordingly the plastic base is, therefore, open on both sides of the disc to permit maximum heat transfer. As herein shown, the central portion of the base 1 is provided with two holes 34 between the surfaces 32 and 36 and with a connecting portion 35 between the holes to support the projection 33 thereof. The base is preferably thickened at the portion 35 to provide straight shoulders 38 which extend laterally parallel to the adjacent edge of the terminal portions 85 to prevent turning of the terminals about their rivets. If desired, the portions 85 engage the shoulders 38 to provide a rigid connection and prevent any turning of the terminals.

The assembly of the present invention is advantageous not only because of its low cost but also because of its small size. Since the base plate may have a thickness less than 0.2 inch, the assembly will fit in a very narrow space. The base plate 1 usually has a length of 1 to 3 inches, a width of about 0.4 to 1 inch and a thickness of about 0.1 to 0.3 inch, but it will be understood that the size and shape of the parts may be varied considerably. If desired, the control assembly may be made substantially as shown in the drawings, which are drawn substantially to scale.

The operation of the thermostatic control assembly of this invention will become apparent from FIGURE 2A which shows the position of the parts when the switch contact elements 2 and 17 are open and the spring arm 4 is held in its lowermost position by the thermostatic disc 5. As shown in this figure, a portion of the peripheral edge 12 at the left is confined in the narrow clearance space 39 between the bottom surface 32 of the recess and the flat upper surface of the arm. The portion of the circumferential edge 12 within the clearance space 39 is retained in said clearance space so that the diametrically opposite portion of the disc contacting the arm 4 near the free end of said arm will be spaced a substantial distance from the surface 32 as shown in FIGURE 2A. The convex surface 13 engages the projection 33 of the connecting portion 35 and holds the movable contact portion 17 a distance from the stationary contact 2 which is preferably at least twice the distance moved by a point on the center of the disc relative to the disc when the disc snaps between its stable positions of opposite concavity. The projection 33, therefore, provides pivot means which, in conjunction with the confining means at clearance space 39, multiplies the movement of the disc and provides the arm 4 with maximum opening movement. It is thus possible to break the flow of current between the contact 2 and the arm 4 even though the center of the disc moves only a small amount. It is, therefore, possible to provide thermostatic discs which respond to very small changes in temperature.

It will be understood that the above description is by way of illustration rather than limitation and that, in accordance with the provisions of the patent laws, variations and modifications of the specific devices disclosed herein may be made without departing from the spirit of the invention.

Having described my invention, I claim:

1. A thermostatic control assembly comprising a base of non-metallic non-conductive material having a pair of spaced electrical terminals mounted thereon, a snap-acting bimetallic thermostatic disc having two stable positions of opposite concavity, said disc moving from one of said positions to the other in response to temperature change, means forming a shallow recess in said base between said terminals for receiving said disc and for limiting transverse movement of the disc in said recess, a conductive metal contact arm in said recess forming a leaf spring extending transversely of said disc to engage the disc and retain it in said recess, said arm being rigidly connected to said base at one terminal and having a free end portion for engaging a stationary contact at the other terminal to close the electric circuit between said terminals, pivot means carried by said base near the center of said recess for engaging the adjacent face of the disc when said face is convex to form a pivot, said spring arm closing said circuit when said last-named face is concave, said disc moving into contact with said pivot means and engaging said arm near the free end thereof at a point along the circumference of the disc to swing the arm away from said stationary contact and open said circuit in response to heating of the disc above a predetermined temperature.

2. A thermostatic control as defined in claim 1 wherein said base has an opening therethrough to expose the central portion of said disc and a narrow connecting portion of said base extends across said opening, said pivot means comprising a projection carried by said last-named portion.

3. In combination, an elongated base plate of dielectric material having a shallow central recess and longitudinal grooves at opposite ends of said recess, a terminal mounted on said base plate near each of said grooves, a floating snap-acting thermostatic disc mounted in said recess, said base plate having a projecting pivot portion at the center of said recess for engaging the central portion of said disc and openings at opposite sides of said pivot portion to expose said disc to heat, means on said base forming upright guide surfaces near the peripheral edge of said disc to prevent longitudinal and transverse movement thereof, and a cantilever-mounted leaf spring of electrically conductive metal traversing said disc and located in said longitudinal grooves to conduct an electric current between said terminals.

4. In a thermostatic control assembly, a base plate having a pair of electrical terminals and a cantilever-mounted spring arm for connecting said terminals to effect flow of electric current between said terminals, said spring arm having a movable contact portion at its free end for engaging a stationary contact at one of said terminals, and means for moving said arm in a direction to separate said contacts comprising a bimetallic thermostatic disc located in a recess in said base plate and sandwiched between said arm and the bottom of said recess, said disc having its peripheral edge portion engageable with said arm near the free end thereof and a diametrically opposed edge portion confined at the bottom of said recess, said one edge portion of the disc moving toward and away from the bottom of the recess to effect separation of said contacts and a small projection at the bottom of the recess at the center of said disc upon which the disc pivots to effect said separation of the contacts and opening of the circuit through the control.

References Cited

UNITED STATES PATENTS

| | | | |
|---|---|---|---|
| 2,199,638 | 5/1940 | Lee | 200—122 |
| 2,579,389 | 12/1951 | Mertler | 200—138 |
| 2,767,284 | 10/1956 | Moksu | 200—138 |
| 3,205,328 | 9/1965 | Maytnier | 200—138 |

FOREIGN PATENTS

| | | |
|---|---|---|
| 1,301,927 | 7/1962 | France. |
| 361,321 | 5/1962 | Switzerland. |

BERNARD A. GILHEANY, *Primary Examiner.*

H. A. LEWITTER, L. A. WRIGHT, *Assistant Examiners.*